United States Patent
Peters

(10) Patent No.: US 7,158,321 B2
(45) Date of Patent: Jan. 2, 2007

(54) PRE-SCAN ASSEMBLY FOR ALIGNING A PRE-SCAN LENS IN A LASER SCANNING UNIT

(75) Inventor: Danny Wayne Peters, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 348 days.

(21) Appl. No.: 10/805,053

(22) Filed: Mar. 19, 2004

(65) Prior Publication Data

US 2005/0206716 A1    Sep. 22, 2005

(51) Int. Cl.
*G02B 7/02* (2006.01)
*B41J 2/47* (2006.01)

(52) U.S. Cl. .................... 359/811; 359/819; 347/225

(58) Field of Classification Search ............. 347/225; 359/811, 819
See application file for complete search history.

(56) References Cited

U.S. PATENT DOCUMENTS

| | | | |
|---|---|---|---|
| 4,474,422 A * | 10/1984 | Kitamura | 359/204 |
| 5,506,719 A | 4/1996 | Murakami et al. | |
| 5,701,191 A | 12/1997 | Iwasaki | |
| 5,808,774 A | 9/1998 | Kawabata | |
| 5,870,133 A | 2/1999 | Naiki | |
| 5,933,248 A | 8/1999 | Hirata | |
| 6,038,353 A | 3/2000 | Naiki et al. | |
| 6,075,549 A | 6/2000 | Bridges | |
| 6,118,598 A | 9/2000 | Gardner, Jr. | |
| 6,166,759 A | 12/2000 | Blanding | |
| 6,639,621 B1 | 10/2003 | Tamaru | |
| 6,671,107 B1 * | 12/2003 | Chee | 359/819 |
| 2002/0051245 A1 | 5/2002 | Takase et al. | |
| 2003/0137753 A1 * | 7/2003 | Takase | 359/811 |
| 2004/0047389 A1 * | 3/2004 | Cannon et al. | 372/101 |

* cited by examiner

*Primary Examiner*—Lamson Nguyen
*Assistant Examiner*—Carlos Martinez
(74) *Attorney, Agent, or Firm*—Stevens & Showalter

(57) ABSTRACT

A pre-scan assembly for a laser scanning unit including printhead housing having a polygonal mirror and collimation assembly including a laser light source emitting a light beam along a light beam axis. The pre-scan assembly is located between the collimation assembly and the polygonal mirror and includes a pre-scan lens assembly including a carrier and a pre-scan lens supported in the carrier. The pre-scan assembly additionally includes a pre-scan mount for supporting the pre-scan lens assembly and defining angular alignment surfaces. The carrier includes outer side surfaces for engaging the angular alignment surfaces where engagement of the carrier side surfaces with the angular alignment surfaces aligns the pre-scan lens optical axis with the light beam axis in the scan direction.

21 Claims, 4 Drawing Sheets

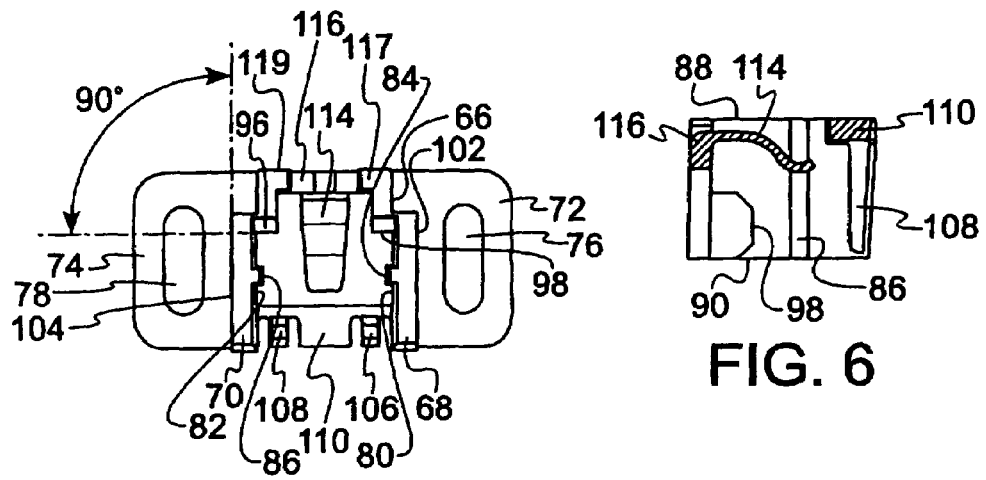
FIG. 5
FIG. 6
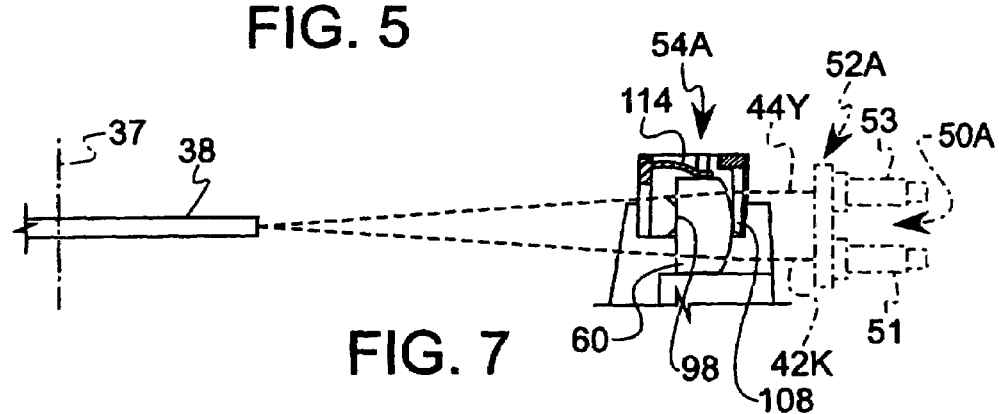
FIG. 7
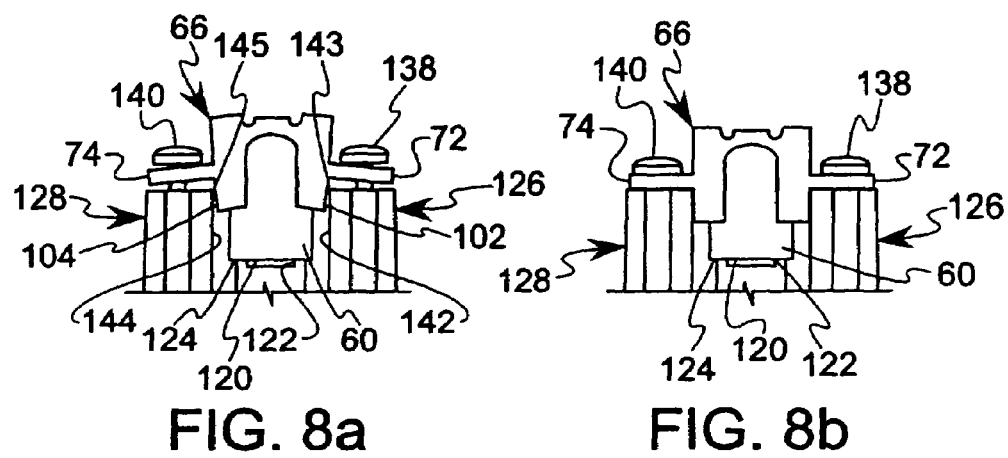
FIG. 8a
FIG. 8b

PRE-SCAN ASSEMBLY FOR ALIGNING A PRE-SCAN LENS IN A LASER SCANNING UNIT

BACKGROUND OF THE INVENTION

1. Field of the Invention

The present invention relates to an electrophotographic imaging apparatus, and more particularly, to a pre-scan assembly for facilitating accurate alignment of a pre-scan lens in an electrophotographic imaging apparatus.

2. Description of Related Prior Art

In electrophotography, a latent image is created on the surface of an electrostatically charged photoconductive drum by exposing select portions of the drum surface to laser light. Essentially, the density of the electrostatic charge on the surface of the drum is altered in areas exposed to a laser beam relative to those areas unexposed to the laser beam. The latent electrostatic image thus created is developed into a visible image by exposing the surface of the drum to toner, which contains pigment components and thermoplastic components. When so exposed, the toner is attracted to the drum surface in a manner that corresponds to the electrostatic density altered by the laser beam. Subsequently, a print medium such as paper is given an electrostatic charge opposite that of the toner and is passed close to the drum surface. As the medium passes the drum, the toner is pulled onto the surface of the medium in a pattern corresponding to the latent image written to the drum surface. The medium then passes through a fuser that applies heat and pressure thereto. The heat causes constituents including the thermoplastic components of the toner to melt and flow into the interstices between the fibers of the medium and the fuser pressure promotes settling of the toner constituents in these voids. As the toner is cooled, it solidifies and adheres the image to the medium.

In order to produce an accurate representation of an image to be printed, it is necessary for the laser to write to the drum in a scan direction, which is defined by a straight line that is perpendicular to the direction of movement of the print media relative to the drum (the process direction). However, a number of optical elements including lenses and mirrors are typically required in the apparatus, including the printhead, to direct the laser beam towards the drum. Unavoidable imprecision in the shape and mounting of these optical elements with respect to the laser beam and/or drum can introduce process direction errors in the path of travel of the laser beam when writing across a scan line. It is also possible that a scan line written to the drum is not perpendicular to the movement of the print media due to laser misalignment and/or media misregistration. Under these conditions, there may be a skew associated with the printed image.

The prior art has attempted to correct for laser beam process direction position errors by incorporating carefully manufactured optics that are precisely aligned. However, prior proposed constructions to increase the precision of the printhead optics have generally also had associated increased costs to accurately manufacture and mount the components, adding significantly to the cost of the printhead.

Additionally, adjustments have been provided to the printhead optics to permit correction of errors during assembly of the optical components to the printhead. For example, adjustment of the pre-scan lens, translating the pre-scan lens along the axis of the light beam, has been used to adjust for mechanical and optical manufacturing tolerances. However, additional corrections to alignment may also be required to compensate for misalignment of the pre-scan lens in the scan direction if the pre-scan lens is rotated relative to the laser beam axis during the assembly operation.

SUMMARY OF THE INVENTION

The present invention provides a pre-scan assembly for facilitating mounting and accurate alignment of a pre-scan lens, where the assembly process for mounting the pre-scan lens in the printhead housing operates to position the pre-scan lens at a desired angular alignment in a scanning direction.

In accordance with one aspect of the invention, a pre-scan assembly is provided for a laser scanning unit including a printhead housing and having a scanning element for scanning a light beam, and a laser light source emitting at least one light beam along a laser beam axis extending toward the scanning element. The pre-scan assembly comprises a pre-scan lens assembly including a carrier, and a pre-scan lens supported in the carrier and defining a lens optical axis. A pre-scan mount is associated with the housing and is located between the light source and the scanning element. At least one angular alignment datum surface is defined in the pre-scan mount and extends generally parallel to the laser beam axis. The carrier includes at least one carrier alignment surface cooperating with the at least one angular alignment datum surface, whereby the lens optical axis is generally aligned relative to the laser beam axis.

In accordance with another aspect of the invention, a pre-scan assembly is provided for a laser scanning unit including a printhead housing and having a scanning element for scanning a light beam, and a laser light source emitting at least one light beam along a laser beam axis extending toward the scanning element. The pre-scan assembly comprises a pre-scan lens assembly including a carrier, and a pre-scan lens supported in the carrier and defining a lens optical axis. A pre-scan mount is associated with the housing and is located between the light source and the scanning element. A pair of angular alignment datum surfaces are defined in the pre-scan mount and extend generally parallel to the laser beam axis. The carrier includes a pair of carrier alignment surfaces cooperating with the angular alignment datum surfaces, whereby the lens optical axis is generally aligned relative to the laser beam axis.

In accordance with a further aspect of the invention, in a laser scanning unit comprising a scanning element for scanning a light beam, a laser light source emitting at least one light beam along a laser beam axis and a collimation assembly for receiving and substantially collimating the light beam, a pre-scan assembly is provided comprising a pre-scan lens assembly including a carrier, and a pre-scan lens supported in the carrier and defining a lens optical axis. A pre-scan mount is located adjacent the collimation assembly, and a pair of angular alignment datum surfaces are defined in the pre-scan mount and extend generally parallel to the laser beam axis. The carrier includes a pair of carrier alignment surfaces cooperating with the angular alignment datum surfaces, whereby the lens optical axis is generally aligned in a scanning direction.

BRIEF DESCRIPTION OF THE DRAWINGS

The following detailed description of the preferred embodiments of the present invention can be best understood when read in conjunction with the following drawings, where like structure is indicated with like reference numerals, and in which:

FIG. 5 is bottom plan view of the lens carrier;

FIG. 6 is a side cross-sectional view taken through the center of the lens carrier;

FIG. 7 is as schematic view showing the pre-scan assembly in partial cross-section and illustrating a pair of laser light sources emitting light beams transmitted through the pre-scan assembly to the polygonal mirror;

FIGS. 8a and 8b are schematic end views of the pre-scan assembly illustrating assembly of the pre-scan lens assembly to the pre-scan mount.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
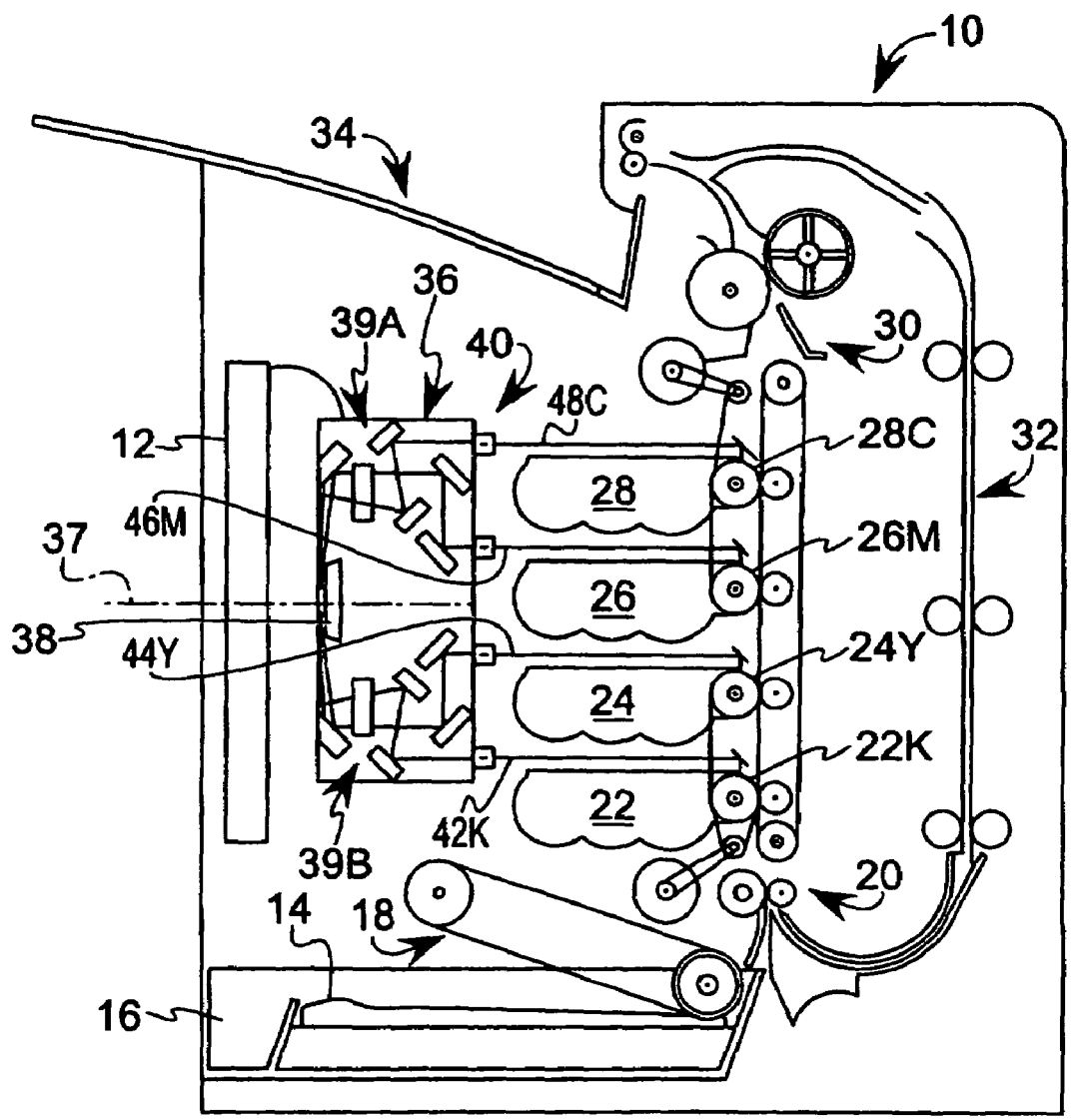
FIG. 1 is a side, schematic view of an exemplary electrophotographic imaging apparatus according to an embodiment of the present invention.

FIG. 1 depicts a representative electrophotographic image forming apparatus, such as a color laser printer, which is indicated generally by the numeral 10. An image to be printed is electronically transmitted to a controller 12 by an external device (not shown). The controller 12 includes system memory, one or more processors, and other logic necessary to control the functions of electrophotographic imaging.

In performing a printing operation, the controller 12 initiates an imaging operation where a top sheet 14 of a stack of media is picked up from a media tray 16 by a pick mechanism 18 and is delivered to a media transport belt 20. The media transport belt 20 carries the sheet 14 past each of four image forming stations 22, 24, 26, 28, which apply toner to the sheet 14. The image forming station 22 includes a photoconductive drum 22K that delivers black toner to the sheet 14 in a pattern corresponding to a black image plane of the image being printed. The image forming station 24 includes a photoconductive drum 24Y that delivers yellow toner to the sheet 14 in a pattern corresponding to the yellow image plane of the image being printed. The image forming station 26 includes a photoconductive drum 26M that delivers magenta toner to the sheet 14 in a pattern corresponding to the magenta image plane of the image being printed. The image forming station 28 includes a photoconductive drum 28C that delivers cyan toner to the sheet 14 in a pattern corresponding to the cyan image plane of the image being printed. The controller 12 regulates the speed of the media transport belt 20, media pick timing and the timing of the image forming stations 22, 24, 26, 28 to effect proper registration and alignment of the different image planes to the sheet 14.

The media transport belt 20 then carries the sheet 14 with the unfixed toner image superposed thereon to a fuser assembly 30, which applies heat and pressure to the sheet 14 so as to promote adhesion of the toner thereto. Upon exiting the fuser assembly 30, the sheet 14 is either fed into a duplexing path 32 for performing a duplex printing operation on a second surface of the sheet 14, or the sheet 14 is conveyed from the apparatus 10 to an output tray 34.

To effect the imaging operation, the controller 12 manipulates and converts data defining each of the CYMK image planes into separate corresponding laser pulse video signals, and the video signals are then communicated to a printhead 36. The printhead 36 comprises a printhead housing 35 (see FIG. 2), which is preferably formed as a molded component. The printhead 36 includes four lasers, designated generally as laser pair 50A and laser pair SOB associated with respective collimation assemblies 52A and 52B (see FIG. 2), and a pair of pre-scan lens assemblies 54A and 54B associated with the collimation assemblies 52A and 52B, where the associated collimation assemblies 52A, 52B and pre-scan lens assemblies 54A, 54B define pre-scan optical systems 56A and 56B. The printhead 36 additionally includes a scanning element comprising a single polygonal mirror 38 supported for rotation about a rotational axis 37, and post-scan optical systems 39A and 39B receiving the light beams emitted from the laser pairs 50A, 50B and passing through the pre-scan optical systems 56A, 56B. The optics comprising the pre-scan optical systems 56A, 56B and post-scan optical systems 39A, 39B are referred to generally herein as the optical system 40. Each laser of the laser pairs 50A, 50B generates a laser beam that is modulated according to an associated one of the video signals from the controller 12. In particular, a first laser emits a laser beam 42K that is modulated according to a video signal corresponding to the black image plane. A second laser emits a laser beam 44Y that is modulated according to a video signal corresponding to the yellow image plane. A third laser emits a laser beam 46M that is modulated according to a video signal corresponding to the magenta image plane. Similarly, a fourth laser emits a laser beam 48C that is modulated according to a video signal corresponding to the cyan image plane.

Each laser beam 42K, 44Y, 46M, 48C is reflected off the rotating polygonal mirror 38 and is directed towards a corresponding one of the photoconductive drums 22K, 24Y, 26M and 28C by select lenses and mirrors in the post-scan optical systems 39A, 39B. The rotation of the polygonal mirror 38 and positioning of the post-scan optics 39A, 39B causes each laser beam 42K, 44Y, 46M, 48C to sweep generally, in a scan direction, which is perpendicular to the plane of FIG. 1, across its corresponding photoconductive drum 22K, 24Y, 26M and 28C so as to form an image thereon.

As described above, each collimation assembly 52A, 52B has a pre-scan assembly 54A, 54B associated with it, located between the respective collimation assembly 52A, 52B and the polygonal mirror 38. The pre-scan assemblies 54A, 54B operate to focus and converge the pair of laser light beams emitted from laser pair 50A and laser pair 50B in a cross-scan direction at or near the mirror facet surface of the polygonal mirror 38 to allow each pair of light beams to be scanned by the same polygonal mirror facet. FIG. 7 illustrates laser pair 50A comprising lasers 51 and 53 emitting laser light beams 42K and 44Y. The present invention is directed to providing a pre-scan assembly which facilitates positioning and alignment of a pre-scan lens within the optical system 40. The pre-scan assemblies 54A, 54B comprise substantially identical constructions and the components and operation of the pre-scan assemblies 54A, 54B will be described with particular reference to the pre-scan assembly 54A, it being understood that the description is equally applicable to the pre-scan assembly 54B.

Figure 2:
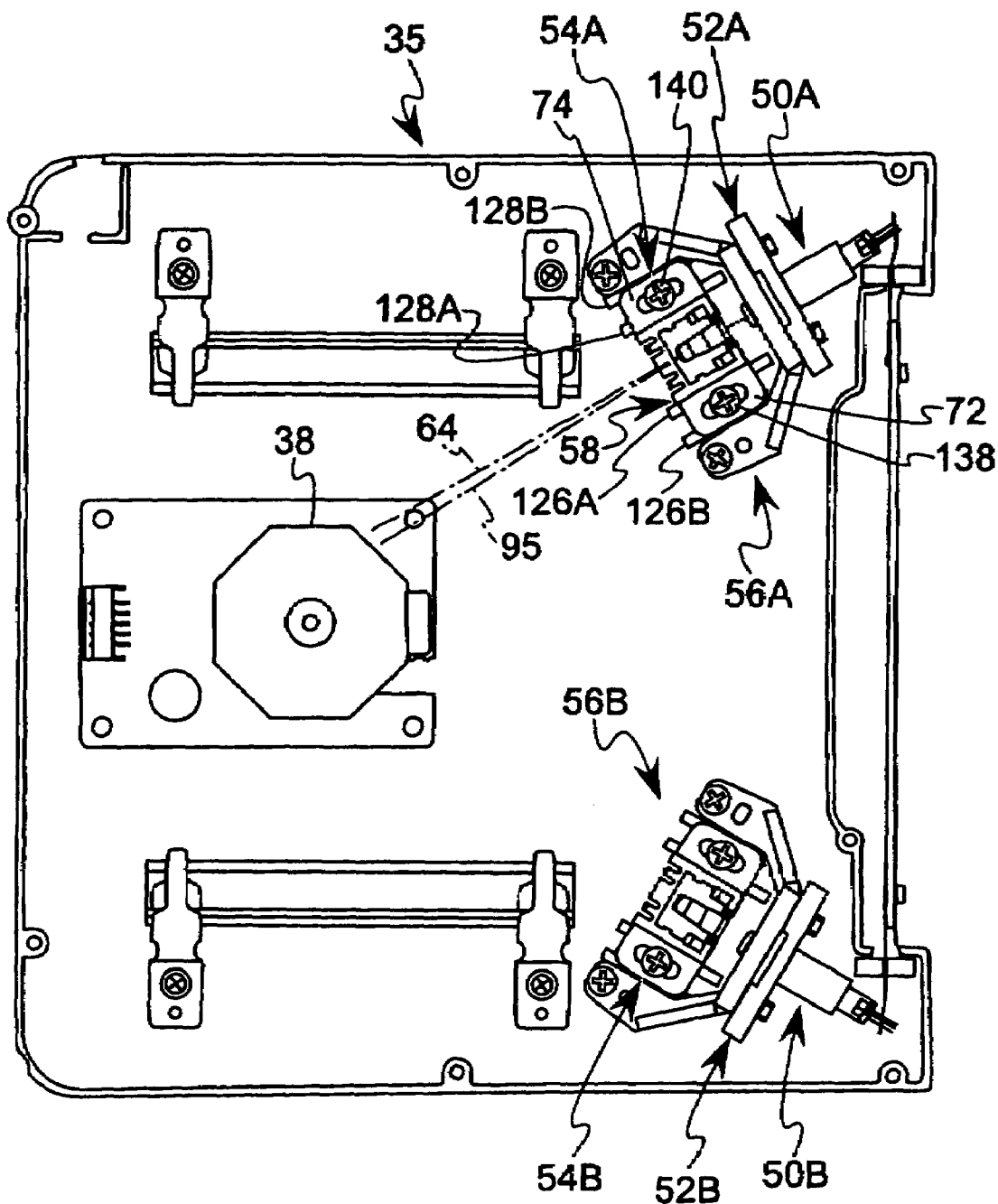
FIG. 2 is plan view illustrating a printhead incorporating two of the pre-scan assemblies of the present invention.
Figure 3:
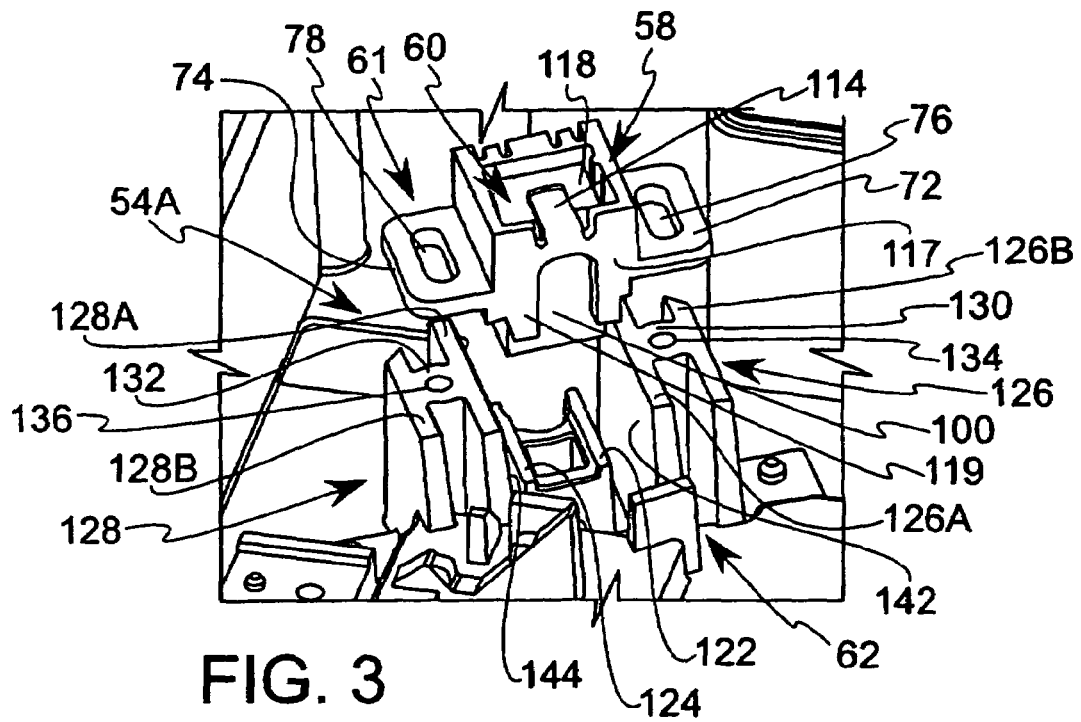
FIG. 3 is a perspective view illustrating a portion of the printhead including a pre-scan mount and a pre-scan lens assembly prior to mounting to the pre-scan mount.

Referring to FIG. 3, the pre-scan assembly 54A comprises a lens carrier 58 and a pre-scan lens 60 supported in the carrier 58 to define a pre-scan lens assembly 61. A pre-scan mount 62 is provided in the printhead 36, and is preferably molded with the printhead housing 35, for supporting the carrier 58 at a predetermined alignment relative to an axis 64 (see FIG. 2) of the laser light beams 42K, 44Y, with reference to the scan direction. As will be described further below, the pre-scan mount 62 and carrier 58 are provided with datum surfaces which cooperate with each other to position the pre-scan lens assembly 61 in proper alignment as the carrier 58 is assembled to the mount 62.

Figure 4:
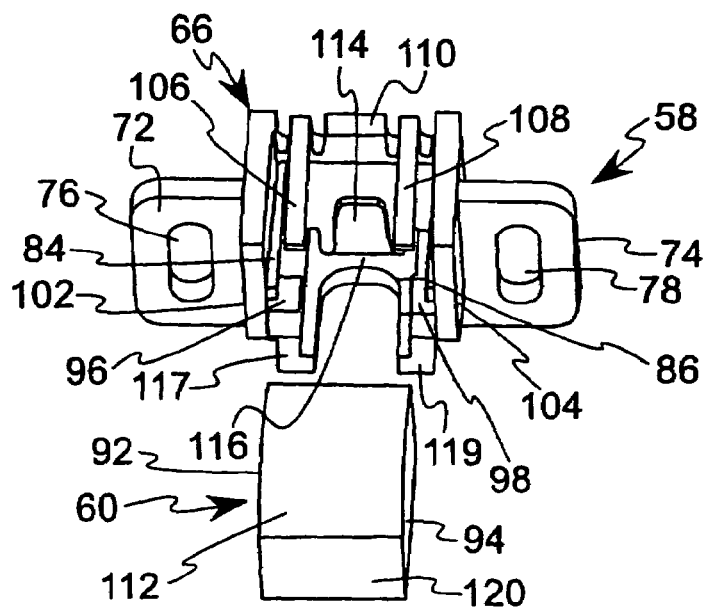
FIG. 4 is a perspective view of a lower portion of the lens carrier prior to mounting of the pre-scan lens.

Referring further to FIGS. 4–6, the carrier 58 is preferably formed as a unitary molded component and includes a carrier body 66 having opposing lateral sides 68, 70, and first and second planar wing members 72, 74 extending outwardly from the lateral sides 68, 70, substantially perpendicular to the lateral sides 68, 70. Each of the wing members 72, 74 includes a respective elongated slot 76, 78 formed therethrough for facilitating positioning of the carrier 58 on the mount 62 in a process direction parallel to the light beam axis 64.

The carrier sides 68, 70 include interior surfaces 80, 82 and rib portions 84, 86 extending inwardly into an interior portion of the carrier body 66. The rib portions 84, 86 extend from an upper portion 88 to a lower portion 90 of the carrier body 66 and are adapted to engage planar side walls 92, 94 of the pre-scan lens 60 whereby the pre-scan lens 60 is generally positioned within the pre-scan assembly 54A with the optical axis 95 of the pre-scan lens 60 aligned to the light beam axis 64 in the scan direction. The optical axis 95 is shown in FIG. 2 as being offset from the light beam axis 64 for illustrative purposes to show a possible misalignment between the axes 64 and 95 prior to completion of the assembly process for the pre-scan assembly 54A.

The carrier body 66 further includes a pair of inner engagement surfaces 96, 98 defining lens datum surfaces for engaging a planar rear surface 100 of the pre-scan lens 60. The inner engagement surfaces 96, 98 are precisely positioned to define a datum line which is at a controlled angle, i.e. oriented at 90°, to datum surfaces defined by outer carrier alignment surfaces 102, 104 of the lateral sides 68, 70. Control of the relationship between the datums defined by the inner engagement surfaces 96, 98 and outer carrier alignment surfaces 102, 104 is obtained by holding a close tolerance for formation of these surfaces, such as by maintaining a close tolerance for forming these surfaces in a mold for the carrier 58.

The pre-scan lens 60 is biased into engagement with the inner engagement surfaces 96, 98 by means of a pair of resilient retention members 106, 108 which are formed integrally with a front cross-member 110 of the body 66. The retention members 106, 108 are resiliently movable relative to the inner engagement surfaces 96, 98 and engage a convex front surface 112 of the pre-scan lens 60 whereby the pre-scan lens 60 is slidably and frictionally held in position within the carrier 58. The frictional retention of the pre-scan lens 60 within the carrier 58 facilitates handling of the pre-scan lens 60 during assembly and further permits movement of the pre-scan lens 60 relative to the carrier 58 in a cross-scan direction, generally perpendicular to the light beam axis 64, during mounting of the pre-scan lens assembly 61 to the mount 62. It should be noted that accurately locating the rear surface 100 of the pre-scan lens 60 in relation to the outer surfaces 102, 104 of the carrier 58 facilitates precise alignment of the optical axis 95 of the pre-scan lens 60 relative to the light beam axis 64, as will be described further below.

The carrier body 66 includes an upper resilient member 114 formed integrally with a rear cross-member 116 joining two rear wall sections 117, 119 of the carrier body 66. The rear wall sections 117, 119 define an arch shaped passage for the light beams through the rear portion of the carrier body 66. The upper resilient member 114 engages an upper surface 118 of the pre-scan lens 60 to bias the pre-scan lens 60 in a direction toward the lower portion 90 of the carrier body 66. A lower surface 120 of the pre-scan lens 60 engages a pair of lower datum surfaces 122, 124 of the pre-scan mount 62 which extend longitudinally in the process direction parallel to the light beam axis 64 (see FIG. 3). The upper resilient member 114 biases the pre-scan lens 60 onto the lower datum surfaces 122, 124 to locate the pre-scan lens 60 at a predetermined location in the cross-scan direction, as may be further seen in FIGS. 7, 8a and 8b.

The pre-scan mount 62 further includes first and second support structures 126, 128 located on either side of the lower datum surfaces. The first support structure 126 includes a pair of inner and outer support members 126A, 126B for engagement with the first wing member 72 of the carrier 58, and the second support structure 128 includes a pair of inner and outer support members 128A, 128B for engagement with the second wing member 74 of the carrier 58. In addition, the first and second support structures 126, 128 include first and second attachment portions 130 and 132 located between the respective inner and outer support members 126A, 126B and 128A, 128B. The first and second attachment portions 130, 132 each define a respective aperture 134, 136 for receiving a threaded fastener 138, 140 (FIGS. 8a and 8b) engaged through the slots 76, 78 in the wing members 72, 74.

The inner support members 126A and 128A each include a respective angular alignment surface 142 and 144, where the angular alignment surfaces 142, 144 define datum surfaces, aligned parallel to the light beam axis 64, for providing angular alignment of the carrier 58 in the scan direction. Specifically, the outer surfaces 102, 104 of the carrier 58 engage with the angular alignment surfaces 142, 144 to accurately orient the datum defined by the inner engagement surfaces 96, 98, and thus locate the pre-scan lens front and rear surfaces 100, 112 perpendicular to the light beam axis 64.

FIGS. 8a and 8b illustrate a portion of the process of assembling the carrier 58 to the pre-scan mount 62 where FIG. 8a shows the carrier 58 in an initial position, prior to rigid attachment of the carrier 58 to the pre-scan mount 62, in which the pre-scan lens 60 is biased into engagement with the lower datum surfaces 122, 124, and the carrier 58 is adjustable in the process direction along the extent of the slots 76, 78. In positioning the carrier 58 on the pre-scan mount 62, the lower edges of the lateral sides 68, 70 of the carrier body 66 are typically flexed inwardly toward each other such that corner edges 143, 145 defined at the upper edges of the angular alignment surfaces 142, 144 engage the carrier outer surfaces 102, 104 in an interference fit to substantially align the carrier 58, as seen in FIG. 8a. It should be noted the front and rear cross-members 110 and 116 of the carrier body 66 define flexible portions of the carrier body 66 which permit flexing of the carrier body 66 about an axis parallel to the light beam axis 64 while maintaining the lateral sides 68, 70 substantially parallel to each other. In addition, it should be understood that sufficient clearance is provided between the rib portions 84, 86 and the pre-scan lens side walls 92, 94 to accommodate the inward flexing of the lateral sides 68, 70.

As the fasteners 138, 140 are tightened in the apertures 134, 136, the wing members 72, 74 are caused to seat flat on the top of the support members 126A, 126B and 128A, 128B. Seating of the wing members 72, 74 on the support members 126A, 126B and 128A, 128B is accompanied by moment force applied to the carrier body 66 drawing the lateral sides 68, 70 outwardly to position the carrier outer surfaces 102, 104 into firm engagement with the angular alignment surfaces 142, 144, which engagement ensures precise alignment of the carrier 58 relative to the pre-scan mount 62 and therefore precise alignment of the optical axis 95 of the pre-scan lens 60 relative to the light beam axis 64. In particular, accurate angular positioning of the optical axis 95 of the pre-scan lens 60 relative to the light beam axis 64 is provided through accurate alignment of the inner engagement surfaces 96, 98 of the carrier 58 relative to the angular alignment surfaces 142, 144.

Further, the present construction in which the pre-scan lens 60 is held within the carrier 58 through frictional engagement between the inner engagement surfaces 96, 98 and the retention members 106, 108 provides an efficient means for handling the pre-scan lens 60 prior to and during installation on the pre-scan mount 62, facilitating positioning and alignment of the pre-scan lens 60 on the pre-scan mount 62 while also allowing translational positioning of the pre-scan lens 60 along the light beam axis 64.

Having described the invention in detail and by reference to a preferred embodiment thereof, it will be apparent that modifications and variations are possible without departing from the scope of the invention defined in the appended claims.

What is claimed is:

1. A pre-scan assembly for a laser scanning unit including a printhead housing and having a scanning element for scanning a light beam, and a laser light source emitting at least one light beam along a laser beam axis extending toward said scanning element, said pre-scan assembly comprising:
   a pre-scan lens assembly including a carrier, and a pre-scan lens supported in said carrier and defining a lens optical axis;
   a pre-scan mount associated with said housing and located between said light source and said scanning element;
   a pair of angular alignment datum surfaces defined in said pre-scan mount and extending generally parallel to said laser beam axis;
   said carrier including a pair of carrier alignment surfaces located on opposing sides of said carrier;
   said carrier comprising a flexible central structure joining said opposing sides whereby said carrier alignment surfaces are movable relative to one another; and
   said carrier alignment surfaces cooperating with said angular alignment datum surfaces, whereby said lens optical axis is generally aligned relative to said laser beam axis.

2. The pre-scan assembly of claim 1 wherein said carrier alignment surfaces are movable in a direction transverse to said at least one laser beam axis to locate said carrier alignment surfaces in engagement with said angular alignment surfaces.

3. The pre-scan assembly of claim 2 wherein said pre-scan mount includes at least one support surface and said carrier includes at least one wing member extending transverse to at least one of said alignment surfaces and engaged on said at least one support surface.

4. The pre-scan assembly of claim 2 wherein said carrier alignment surfaces are movable relative to said angular alignment datum surfaces in a direction parallel to said laser beam axis.

5. The pre-scan assembly of claim 1 wherein said pre-scan lens is movable relative to said carrier in a direction transverse to said laser beam axis.

6. The pre-scan assembly of claim 5 wherein said pre-scan mount includes at least one second alignment datum surface, said pre-scan lens including an upper and a lower surface, and said lower surface of said pre-scan lens engaging said second alignment datum surface to position said pre-scan lens at a predetermined location relative to said laser beam axis.

7. The pre-scan assembly of claim 6 wherein said carrier includes an upper resilient member engaging said upper surface of said pre-scan lens to bias said pre-scan lens onto said second alignment datum surface.

8. The pre-scan assembly of claim 1 wherein said pre-scan lens includes opposing front and rear faces, said carrier includes an inner surface and a resilient retention structure located in spaced relation from said carrier inner surface, said retention structure engaging said rear face of said pre-scan lens to bias said front face of said pre-scan lens into engagement with said inner surface to retain said pre-scan lens in said carrier.

9. The pre-scan assembly of claim 1 wherein said carrier alignment surfaces are movable away from each other to locate said carrier alignment surfaces in engagement with said angular alignment datum surfaces.

10. A pre-scan assembly for a laser scanning unit including a printhead housing and having a scanning element for scanning a light beam, and a laser light source emitting at least one light beam along a laser beam axis extending toward said scanning element, said pre-scan assembly comprising:
    a pre-scan lens assembly including a carrier, and a pre-scan lens supported in said carrier and defining a lens optical axis;
    a pre-scan mount associated with said housing and located between said light source and said scanning element;
    a pair of angular alignment datum surfaces defined in said pre-scan mount and extending generally parallel to said laser beam axis;
    said carrier including a pair of carrier alignment surfaces cooperating with said angular alignment datum surfaces, whereby said lens optical axis is generally aligned relative to said laser beam axis; and
    wherein said pre-scan mount includes a support surface associated with each of said angular alignment datum surfaces and said carrier includes opposing sides, at least a portion of said carrier sides defining said carrier alignment surfaces, and a wing member extending from each said carrier side transverse to said alignment surfaces, each said wing member engaged on one of support surfaces.

11. The pre-scan assembly of claim 10 including fasteners biasing said wing members toward said support surfaces.

12. The pre-scan assembly of claim 11 wherein said wing members each include a slot portion, elongated in a direction parallel to said laser beam axis, for receiving a respective fastener, whereby said carrier is movable along said support surfaces.

13. The pre-scan assembly of claim 10 wherein said carrier comprises a flexible central structure joining said opposing sides whereby said carrier alignment surfaces are movable relative to one another.

14. The pre-scan assembly of claim 10 wherein said pre-scan lens is movable relative to said carrier in a direction transverse to said laser beam axis.

15. The pre-scan assembly of claim 14 wherein said pre-scan mount includes a second alignment datum surface and said pre-scan lens includes upper and a lower surfaces, said lower surface of said pre-scan lens engaging said second alignment datum surface to locate said pre-scan lens in a direction transverse to said laser beam axis.

16. The pre-scan assembly of claim 15 wherein said carrier includes an upper resilient member engaging said upper surface of said pre-scan lens to bias said pre-scan lens onto said second alignment datum surface.

17. The pre-scan assembly of claim 14 wherein said pre-scan lens includes opposing front and rear faces, said carrier includes an inner surface and a resilient retention structure located in spaced relation from said carrier inner surface, said retention structure engaging said rear face of said pre-scan lens to bias said front face of said pre-scan lens into engagement with said inner surface to retain said pre-scan lens in said carrier.

18. In a laser scanning unit comprising a scanning element for scanning a light beam, a laser light source emitting at least one light beam along a laser beam axis and a collimation assembly for receiving and substantially collimating said light beam, a pre-scan assembly comprising:
a pre-scan lens assembly including a carrier, and a pre-scan lens supported in said carrier and defining a lens optical axis;
a pre-scan mount located adjacent said collimation assembly;
a pair of angular alignment datum surfaces defined in said pre-scan mount and extending generally parallel to said laser beam axis;
said carrier including a pair of carrier alignment surfaces cooperating with said angular alignment datum surfaces, whereby said lens optical axis is generally aligned in a scanning direction; and
wherein said pre-scan mount includes a support surface associated with each of said angular alignment datum surfaces and said carrier includes opposing sides, at least a portion of said carrier sides defining said carrier alignment surfaces, and a wing member extending from each said carrier side transverse to said carrier alignment surfaces, each said wing member engaged on one of support surfaces.

19. The pre-scan assembly of claim 18 including fasteners biasing said wing members toward said support surfaces.

20. The pre-scan assembly of claim 19 wherein said wing members each include a slot portion for receiving a respective fastener, whereby said carrier is movable along said support surfaces in a process direction.

21. The pre-scan assembly of claim 18 including a second light beam emitted by said laser light source, and said collimation assembly substantially collimating said second light beam, said pre-scan lens causing said light beams to converge to substantially the same location on said scanning element.

* * * * *